US011493722B2

United States Patent
Denton

(10) Patent No.: US 11,493,722 B2
(45) Date of Patent: Nov. 8, 2022

(54) CABLE STRIPPING TOOL

(71) Applicant: Metra Electronics Corporation, Holly Hill, FL (US)

(72) Inventor: Stewart Denton, Holly Hill, FL (US)

(73) Assignee: Metra Electronics Corporation, Holly Hill, FL (US)

( * ) Notice: Subject to any disclaimer, the term of this patent is extended or adjusted under 35 U.S.C. 154(b) by 201 days.

(21) Appl. No.: 17/072,542

(22) Filed: Oct. 16, 2020

(65) Prior Publication Data
US 2022/0120990 A1 Apr. 21, 2022

(51) Int. Cl.
*G02B 6/245* (2006.01)
*G02B 6/25* (2006.01)
*G02B 6/44* (2006.01)

(52) U.S. Cl.
CPC .......... *G02B 6/4497* (2013.01); *G02B 6/245* (2013.01); *G02B 6/25* (2013.01)

(58) Field of Classification Search
None
See application file for complete search history.

(56) References Cited

U.S. PATENT DOCUMENTS

| | | | | |
|---|---|---|---|---|
| 2,627,768 A * | 2/1953 | Cook, Jr. | ............. | H02G 1/1217 30/91.1 |
| 5,269,206 A * | 12/1993 | Yagawa | ................. | H02G 1/127 81/9.51 |
| 5,295,421 A * | 3/1994 | Mansfield | ............ | H02G 1/1295 30/90.1 |
| 6,754,960 B1 * | 6/2004 | Shiraishi | ................ | G02B 6/245 30/90.1 |
| 8,678,671 B2 * | 3/2014 | Mulligan | ................. | G02B 6/25 83/913 |
| 9,748,747 B2 * | 8/2017 | Larson | ................. | H02G 1/1214 |
| 9,819,161 B2 * | 11/2017 | Scirbona | ............. | H02G 1/1217 |
| 10,317,641 B2 * | 6/2019 | Santos | ............... | G02B 6/4497 |
| 10,401,569 B2 * | 9/2019 | Scirbona | ............. | G02B 6/4497 |
| 10,451,831 B2 * | 10/2019 | Santos | ..................... | G02B 6/46 |
| 2005/0044715 A1 * | 3/2005 | Shutts | .................. | G02B 6/4497 30/91.2 |
| 2007/0067996 A1 * | 3/2007 | Chang | .................. | H02G 1/1229 30/90.1 |
| 2011/0308358 A1 * | 12/2011 | Iwashita | ................ | G02B 6/245 81/9.51 |
| 2019/0113681 A1 * | 4/2019 | Eisele | .................... | B26D 3/169 |

FOREIGN PATENT DOCUMENTS

| | | | | |
|---|---|---|---|---|
| EP | 990929 A2 * | 4/2000 | ............. | G02B 6/245 |
| GB | 2472256 A * | 2/2011 | ............. | G02B 6/245 |
| JP | 06-76904 | * 10/1994 | | |

* cited by examiner

Primary Examiner — Michelle R Connelly
(74) Attorney, Agent, or Firm — J. Wiley Horton

(57) ABSTRACT

A stripping tool configured to sequentially strip the layers of a cable, such as a fiber optic cable. The stripping tool includes multiple channels, each with a distinct role in stripping a layer of the fiber optic tool. The user sequentially moves the cable from channel-to-channel while operating the tool. At the conclusion of these operations the cable is appropriately stripped and ready for a subsequent operation.

20 Claims, 14 Drawing Sheets

CABLE STRIPPING TOOL

CROSS-REFERENCES TO RELATED APPLICATIONS

Not applicable

STATEMENT REGARDING FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to the field of data transmission cables. More specifically, the invention comprises a cable stripping tool that progressively strips away layers of a data cable.

2. Description of the Related Art

The present invention can be configured for use with many different types of data transmission cables. It is particularly well suited for use with optical data transmission cables, though the invention is not limited to this field. In order to understand the utility of the invention, some background information is helpful and such information is presented in the following paragraphs.

FIG. 1 depicts a prior art fiber optic cable 10, of the type commonly used to transmit data in a variety of applications. This particular example depicts a single-mode optical fiber ("SMF") cable. SMF cable has four distinct layers. The innermost layer is a single strand of glass fiber having a diameter of 8-9 microns. The glass fiber strand is typically called the "core." The core is covered by a cladding layer having an outer diameter of about 125 microns. A buffer layer covers the cladding layer. The outer diameter of the buffer layer is about 250 microns. A layer of shielding strands lies over the buffer layer. These are typically small diameter para-aramid. These strands carry tensile loads and provide suitable stiffness to limit the minimum bend radius imposed on the cables.

A polymer jacket lies over the top of the para-aramid strands. The outer diameter of the polymer jacket varies significantly, depending on the thickness of the shielding strand layer and the thickness of the jacket itself. The outer diameter of the jacket typically lies in the range of 800 microns to 3,000 microns (0.8 mm to 3.0 mm). This is a broad range, but the outer diameter is consistent for a particular type of cable.

A fiber optic cable is often furnished on a wound spool. An appropriate length is taken from the spool and cut. Connectors are then added to the two cut ends of the cable. The process of adding a connector is complicated by the multi-layered design of the cable.

There are many existing tools for stripping the outer layers from a fiber optical cable—thereby preparing it for the installation of a connector. Most such tools resemble plier-based wire strippers. A good example is the JIC-375 marketed by Jonard Tools of 200 Clearbrook Rd., Elmsford, Ney York, U.S.A. This tool includes three separate cutting interfaces created when the jaws are closed on a cable. The first interface strips the jacket. The second interface strips the buffer coating. The third interface strips the cladding.

FIGS. 1-6 illustrate the prior art process for preparing a fiber optical cable for the installation of a connector. The first step is removing the outer polymer jacket. This operation is shown in FIG. 2. A circumferential cut is made around the jacket a length $L_1$ from the end. The liberated portion of jacket 12 is then pulled free to remove shield strands 14. In FIG. 3, shield strands 14 have been separated and pulled away to reveal buffer layer 16. A separate cutter is often used to cut the shield strands at a point close to where they emerge from jacket 12.

In FIG. 4, a second stripper has been used to remove part of buffer layer 16—thereby revealing cladding layer 18. In FIG. 5, a third stripper has been used to remove a portion of cladding layer 18 to reveal optical fiber 20. In FIG. 6, the third stripper has been used a second time to remove another length of cladding layer 18 so that the exposed portion of optical fiber 20 extends all the way to the cut end of buffer layer 16. A solvent is then typically used to clean the optical fiber before the connector is added.

The reader should bear in mind that different prior art cutters perform these steps in different ways. The examples shown in FIGS. 1-6 should properly be viewed as exemplary. In any case, the objective is to produce an exposed length of optical fiber 20 without damaging the fiber in the process. The present invention provides a more convenient tool and process for achieving this result.

BRIEF SUMMARY OF THE PRESENT INVENTION

The present invention comprises a stripping tool configured to sequentially strip the layers of a cable, such as a fiber optic cable. The stripping tool includes multiple channels, each with a distinct role in stripping a layer of the fiber optic tool. The user sequentially moves the cable from channel-to-channel while operating the tool. At the conclusion of these operations the cable is appropriately stripped and ready for a subsequent operation.

Figures 1, 2, 3:
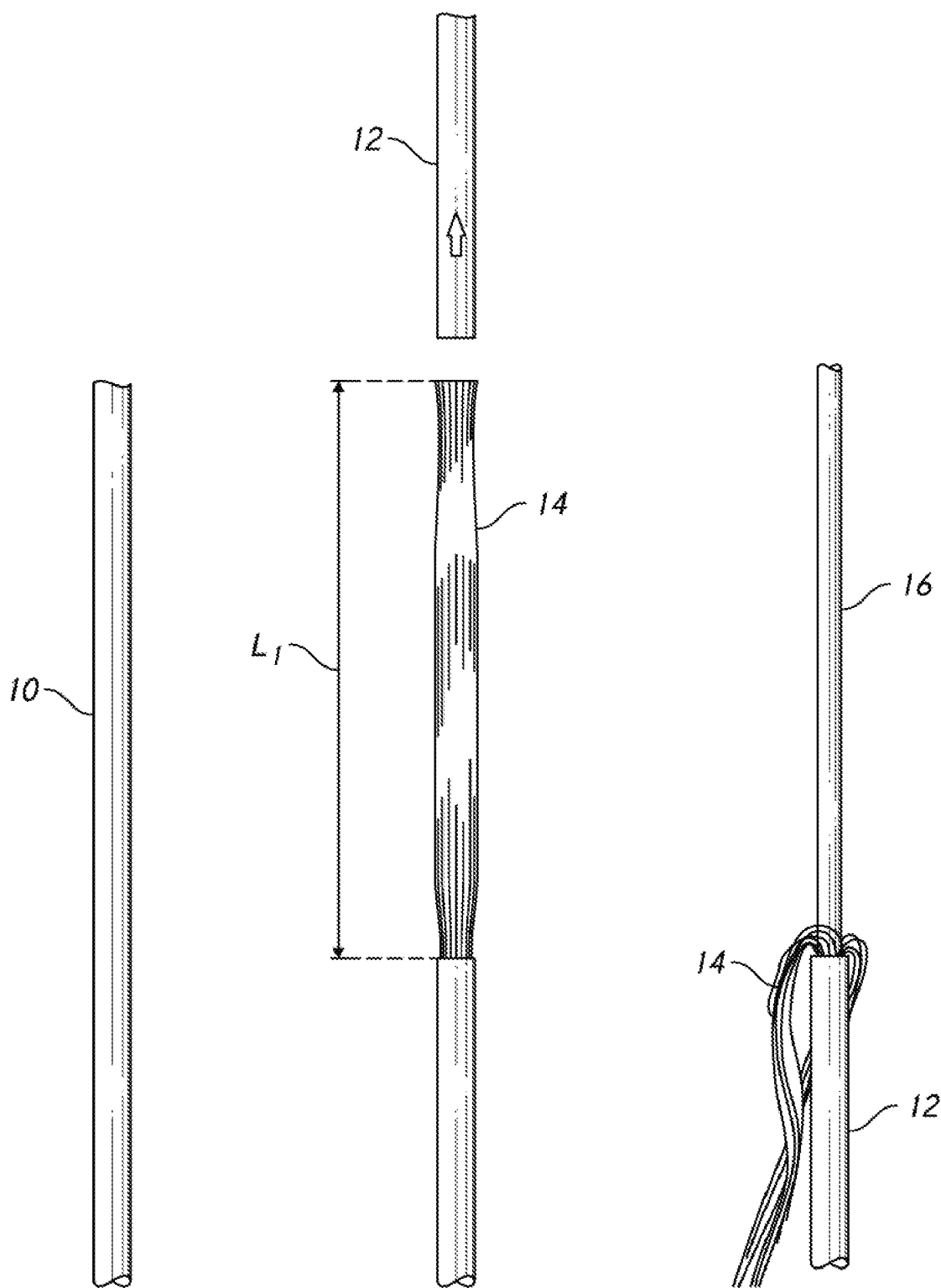
FIG. 1 is an elevation view, showing a prior art fiber optic cable.
FIG. 2 is an elevation view, showing the cable of FIG. 1 with its jacket removed.
FIG. 3 is an elevation view, showing the cable of FIG. 2 with its shield strands peeled back.

REFERENCE NUMERALS IN THE DRAWINGS 10 fiber optic cable
12 jacket
14 shield strands
16 buffer layer
18 cladding layer
20 optical fiber
22 stripping tool
24 first half
26 second half
28 hinge
30 receiver
32 pin
34 first blade holder
36 first blade
38 second blade holder
40 second blade
42 first channel/first half
43 first channel/second half
44 second channel/first half
45 second channel/second half
46 third channel/first half
47 third channel/second half
48 fourth channel/first half
49 fourth channel/second half
50 notch
52 first cutter interface
54 second cutter interface
56 third cutter interface
58 fourth cutter interface
60 cutting edge
61 distal perimeter
62 cutting edge
63 distal perimeter
64 stop
66 stop
68 stop
70 stop
72 tangent section
74 cutter side
76 cutter side
78 non-cutter side
80 opening
82 opening
84 opening

DETAILED DESCRIPTION OF THE INVENTION

The present invention presents a unified stripping tool that can perform the operations described in FIGS. 1-6. As will become apparent, the tool can be configured for use with a wide variety of cables. The embodiment shown is configured for use with a particular fiber optic cable. This embodiment is properly viewed as exemplary. Many other configurations are possible.

Directional terms (top, bottom, let, right, etc.) are used in this disclosure. Unless specifically indicated otherwise, such terms refer strictly to the orientation shown in a particular view. They should not be interpreted as limiting.

Figure 7:
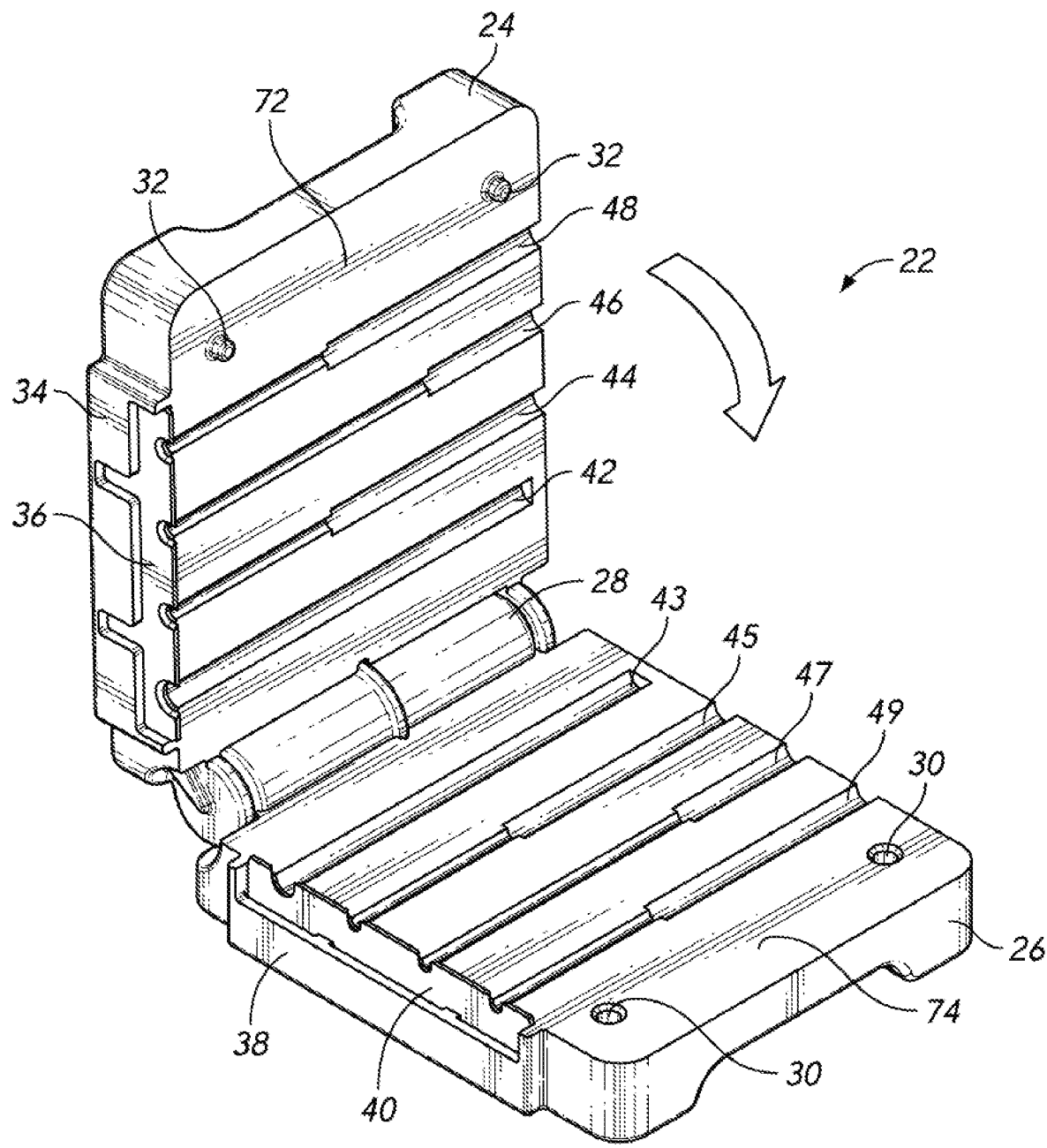
FIG. 7 is a perspective view, showing the inventive stripping tool in an open state.
Figure 8:
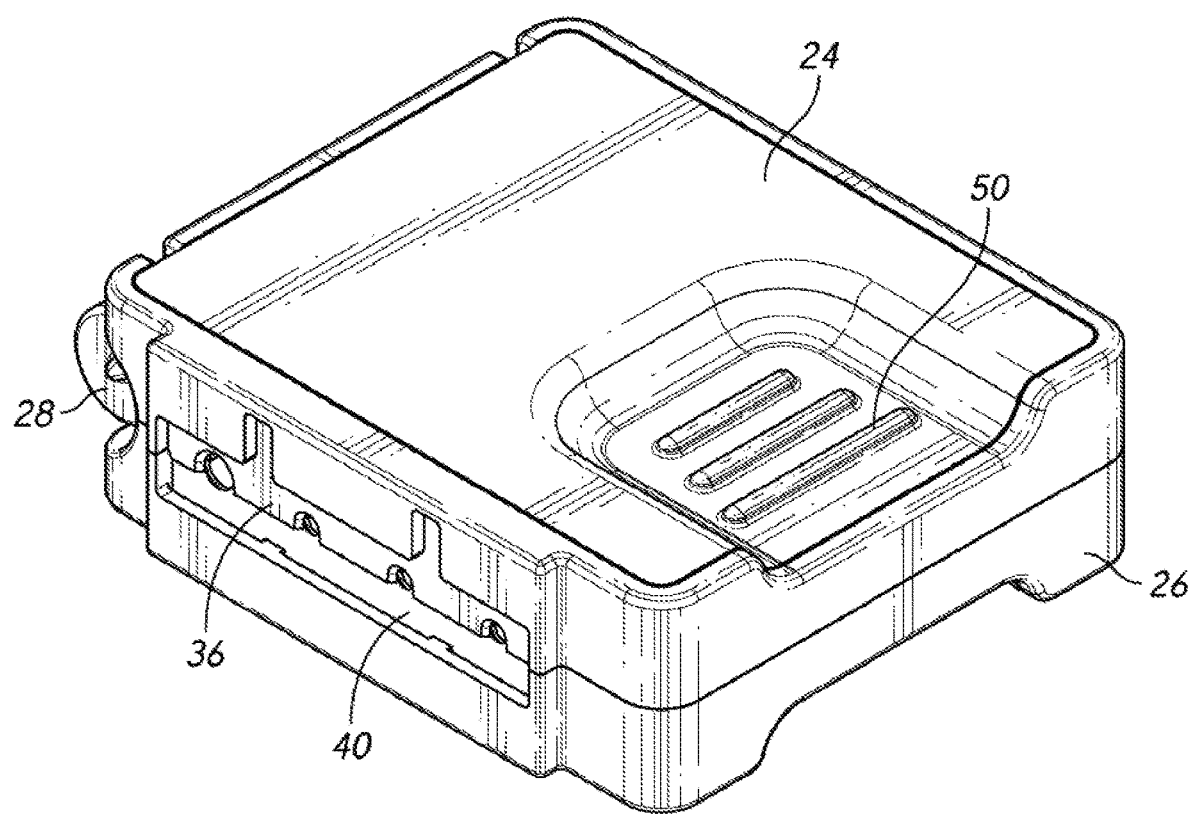
FIG. 8 is a perspective view, showing the inventive stripping tool in a closed state.

FIGS. 7 and 8 provide perspective views of a preferred embodiment. In FIG. 7, stripping tool 22 is shown in an open state. First half 24 is joined to second half 26 by hinge 28. The two halves are designed to rotate about hinge 28. The direction of rotation is arbitrary but—for purposes of this description—one can assume that first half 24 rotates downward in the direction indicated by the arrow. This rotation continues until first mating face 72 contacts second mating face 74. Pins 32 protruding from first mating face 72 slip into receivers 30 on second mating face 74. The pins preferably include a fillet or chamfer on their distal end to facilitate alignment. The two halves mate in a stable configuration.

FIG. 8 shows the same embodiment with the two halves closed together. A notch 50 is provided on each half. These are located so that a user can place a thumb or finger in each notch to aid in gripping and closing the stripping tool.

Returning to FIG. 7, the reader will note the presence of four channels in each of the mating faces 72, 74. In fact, each mating face opens into half of a channel so that when the two faces are pressed together a full channel in created. Each channel runs parallel to the axis of hinge 28. Each channel is configured to receive and locate a cable so that a pair of stripping blades will cut the cable in the proper location for the specific operation being conducted.

First mating face 72 opens into first channel/first half 42. A corresponding first channel/second half 43 is located in second mating face 74. Second channel/first half 44 aligns with second channel/second half 45. Third channel/first half 46 aligns with third channel/second half 47. Fourth channel/first half 48 aligns with fourth channel/second half 49.

The stripping blades are also configured to engage when the two halves of the stripping tool close together. First blade holder 34 in first half 24 mounts first blade 36. Second blade holder 38 in second half 26 mounts second blade 40. Each blade contains part of a circular cutting interface that engages a corresponding feature on the opposite blade. In looking at FIG. 7, the reader will appreciate that when the two halves of the tool are pressed together the channels are closed and the blades 36, 40 are brought together.

Figure 9A:
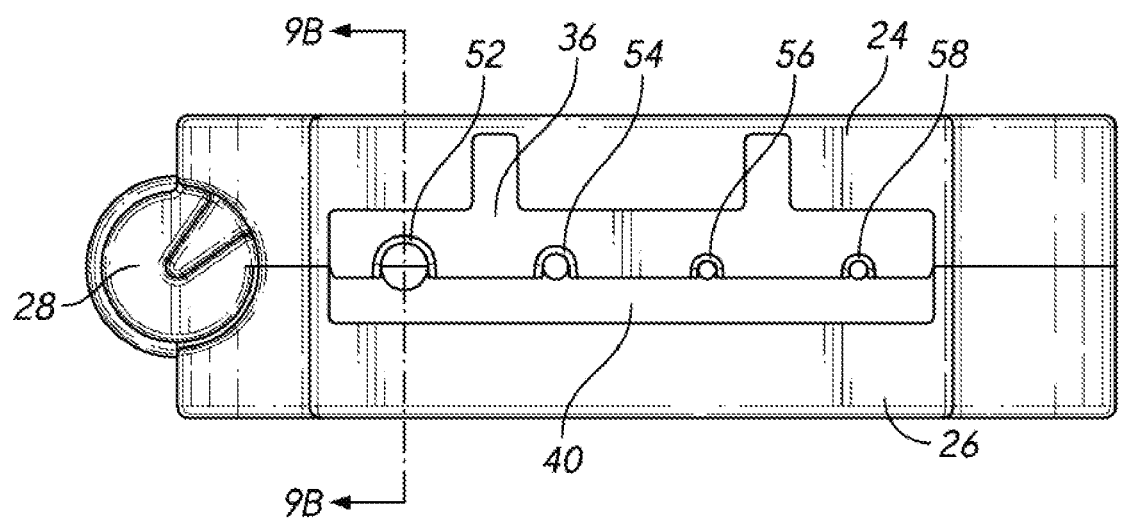
FIG. 9A is an elevation view, showing the inventive stripping tool in a closed state.

The interfaces created by the closing of the two blades are shown in the elevation view of FIG. 9A (with the two halves 24, 26 in the closed configuration). Four channels and four cutting interfaces are included in the embodiment shown. First blade 36 and second blade 40 actually overlap somewhat when the stripping tool is closed as shown. The overlap creates first cutter interface 52, second cutter interface 54, third cutter interface 56, and fourth cutter interface 58. The nature of each of the cutter interfaces is the same, though the sizes differ in order to carry out the differing operations. A "call out" for the sectional view of FIG. 9B is provided in the view of FIG. 9A.

Figure 9B:
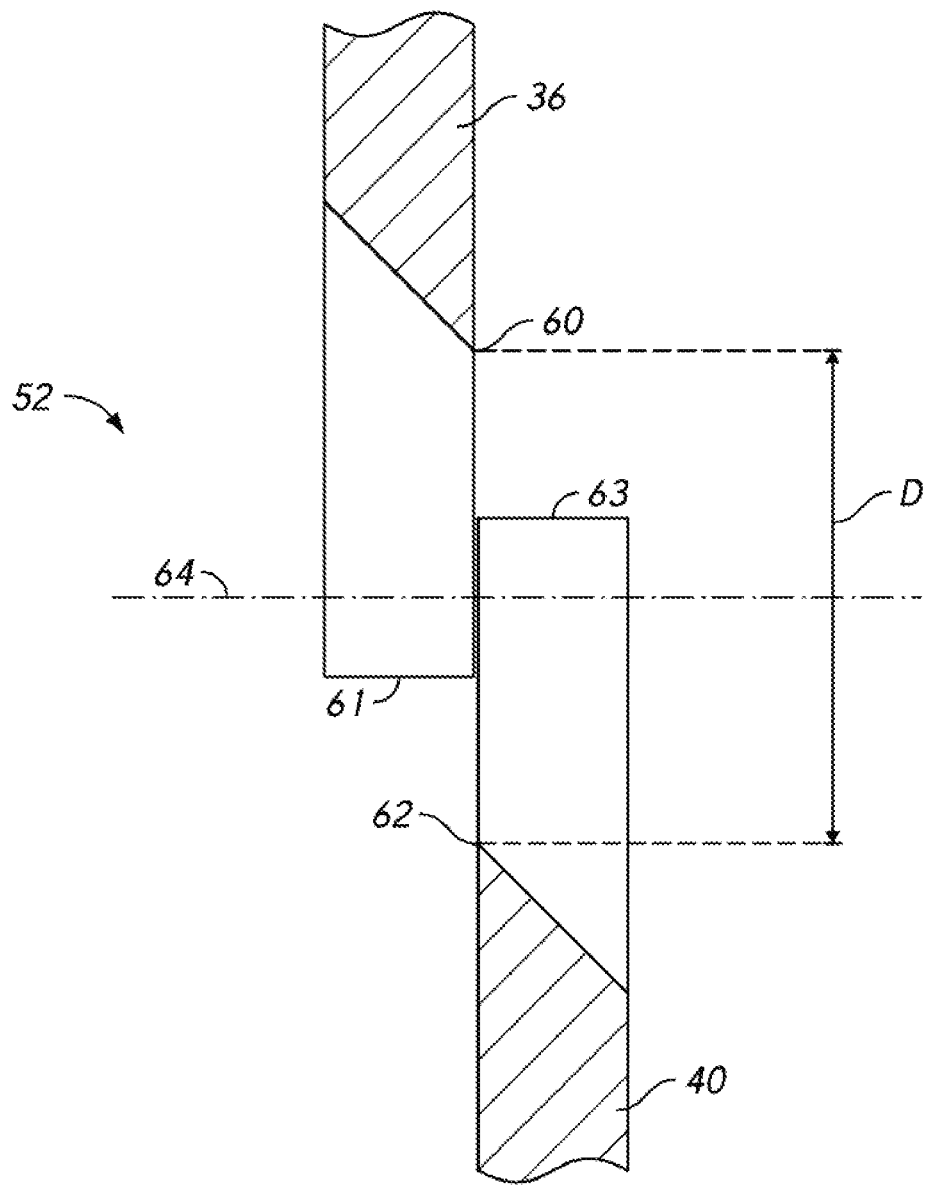
FIG. 9B is a detailed sectional view, showing the engagement of the first and second blades to create a cutter interface.

FIG. 9B provides a sectional view through first cutter interface 52. FIG. 9B shows the configuration when the two halves of the stripping tool are pressed together (as shown in FIGS. 8 and 9A). The region shown is first cutter interface 52. The reader will note that the two blades overlap. In the orientation of the view, distal perimeter 61 of first blade 36 moves downward and comes to rest beneath the height of distal perimeter 63 of second blade 40—thereby creating an overlap.

Axis 64 represents the centerline of the first channel (and thereby the centerline of a first cable placed in the first channel). Cutting edge 60 is a sharp, arcuate cutting edge provided on first blade 36. Cutting edge 62 is a corresponding sharp, arcuate cutting edge provided on second blade 40. These cutting edges follow an arc centered on axis 64. They are separated by a distance "D".

Figure 9C:
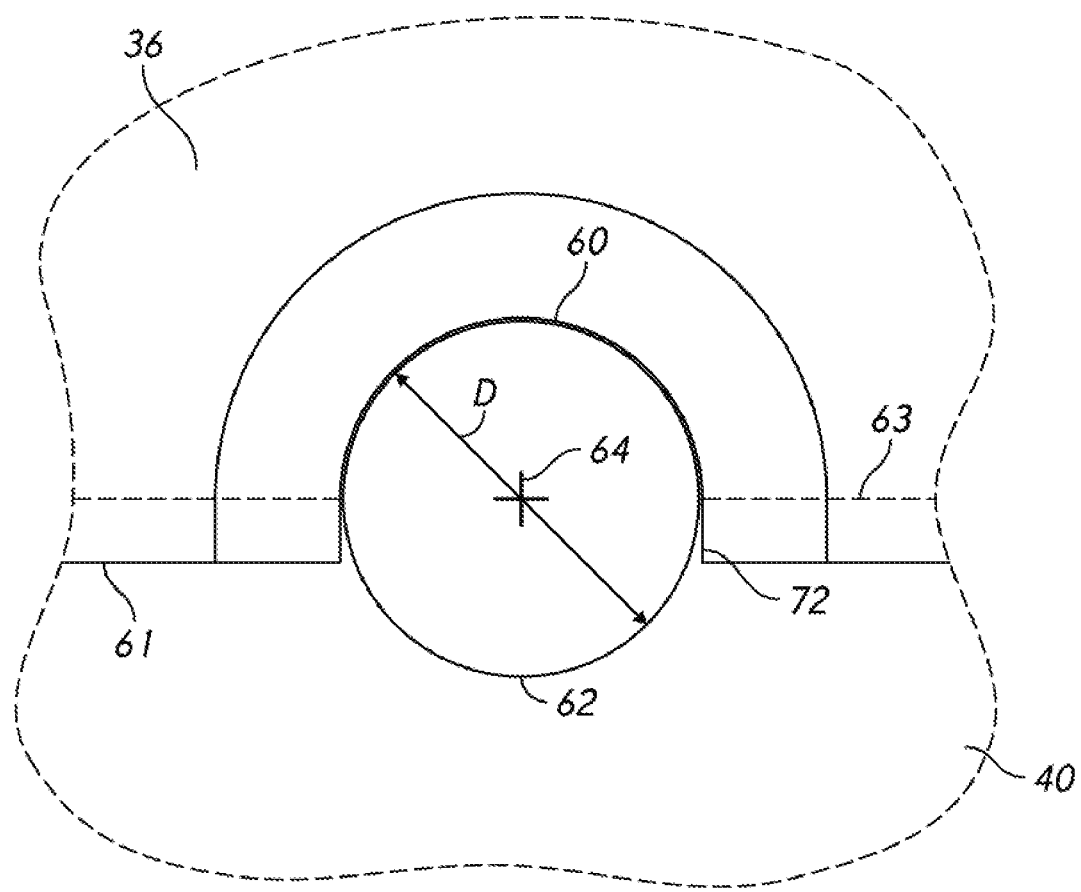
FIG. 9C is a detailed elevation view, showing the engagement of the first and second blades to create a cutter interface.

FIG. 9C provides a detailed elevation view through the same region as depicted in FIG. 9B. Cutting edge 60 on first blade 36 includes an arcuate portion centered on axis 64. Cutting edge 62 on second blade 40 likewise includes an arcuate portion centered on axis 64. Cutting edge 60 also includes two tangent sections 72 leading from the arcuate portion to distal perimeter 61. Likewise, cutting edge 62 includes two tangent sections leading from the arcuate portion to distal perimeter 63.

Once united as shown in FIG. 9C, the two arcuate portions create a full circle having a diameter "D." First cutter interface 52 is configured to remove the jacket but leave the shield strands intact (or mostly intact). As an example, the stripping tool can be configured for a fiber optic cable having an outer diameter of the shield strands of 2.0 mm and an outer diameter of the jacket of 2.6 mm. In this example, the value "D" is set to 1.8 mm. This value consistently cuts the jacket all the way around its circumference without significantly damaging the shield strands.

Details concerning the channels and the operations the cutting tool performs are provided with respect to FIGS. 10-16. The reader should bear in mind that the embodiment described is exemplary. The invention can be provided with more than four channels or fewer than four channels. The cutter interfaces may likewise be altered as needed for various cables.

Figure 10:
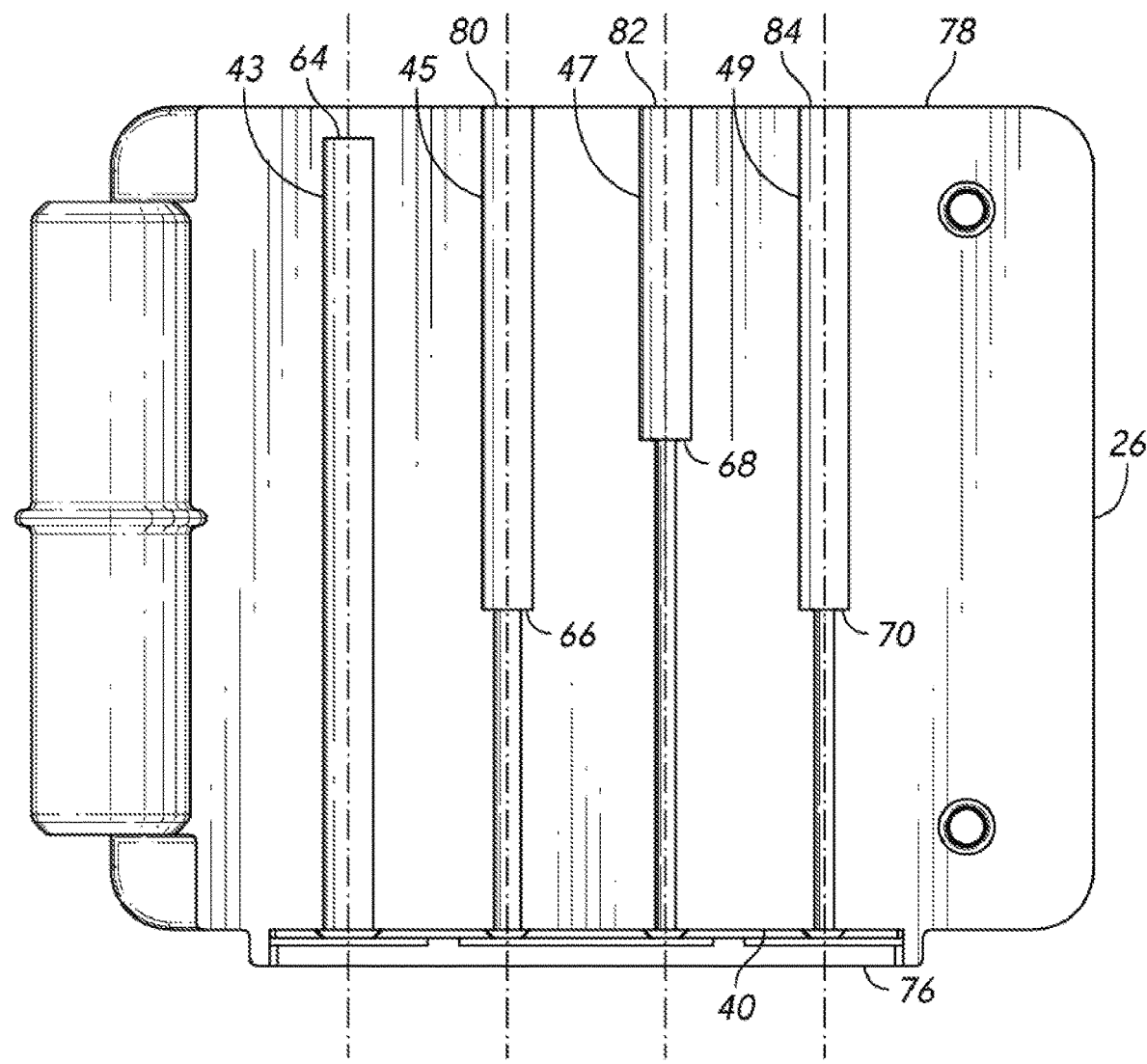
FIG. 10 is a plan view, showing the four channels used in a preferred embodiment of the present invention.

FIG. 10 shows a plan view of second half 26. First half 24 is essentially a mirror of this part, so the descriptions of the channels apply equally to both. First channel/first half 43 has an open end abutting second blade 40 on cutter side 76 of second half 26 (The opposite side of both halves 24, 26 is denoted non-cutter side 78). The far end of first channel/first half 43 is closed by stop 64. The term "stop" is used because this feature is used to positively locate a cable that is placed in the first channel.

Second channel/first half 45 has a first open end abutting second blade 40. It also has a second open end on the opposite side of second half 26 (making the second channel open on both ends). Stop 66 is provided in the central portion of the second channel. Stop 66 is a shoulder formed between two portions of the second channel having a different diameter. Stop 68 is a shoulder formed between two different diameters in the third channel. Stop 70 is a shoulder formed between two different diameters in the fourth channel.

Figure 11:
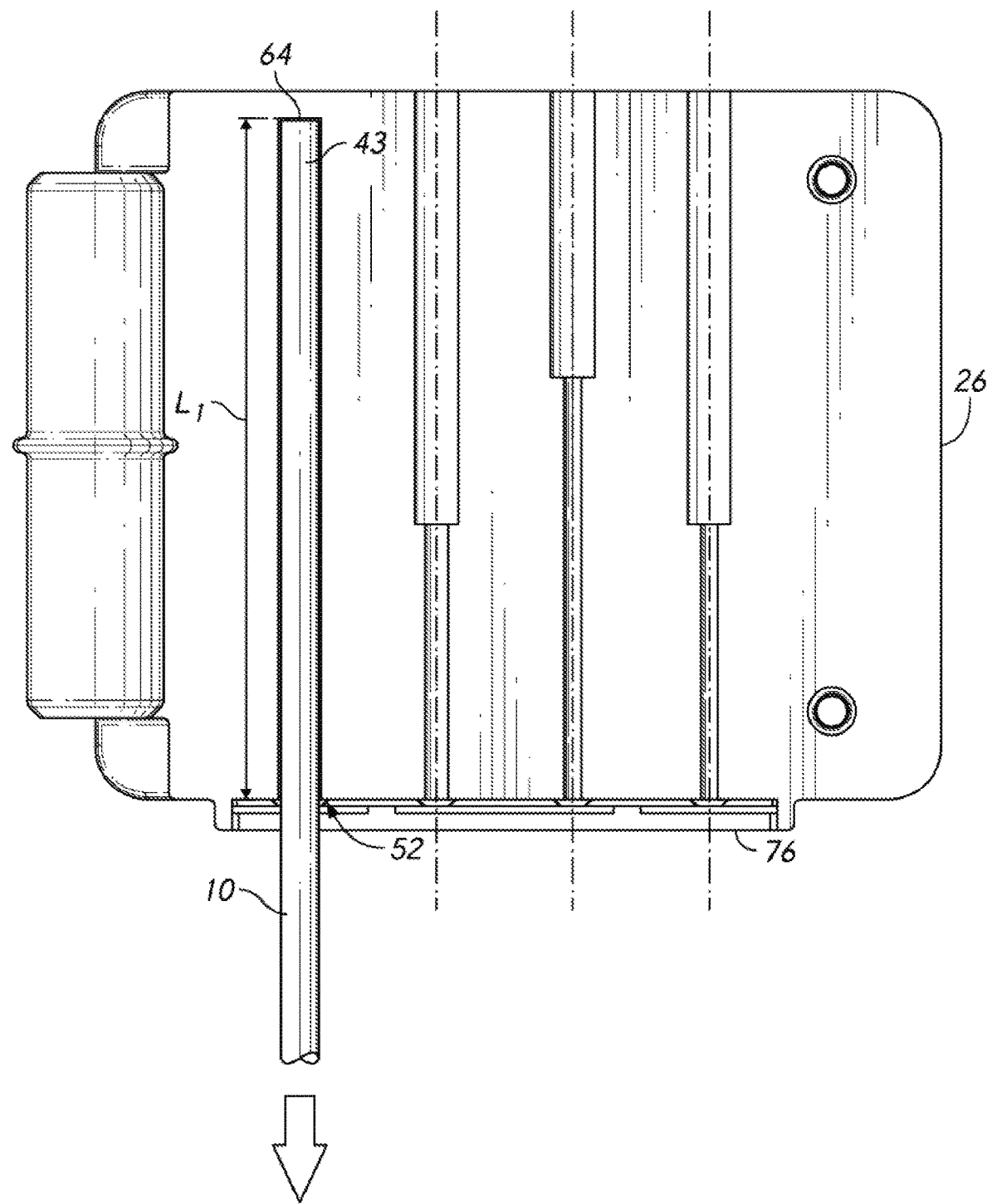
FIG. 11 is a plan view showing the operation of the present invention.

FIG. 11 shows the first operation formed by the inventive stripping tool. The tool is opened as shown in FIG. 7. Fiber optic cable 10 is placed in first channel/second half 43, with the end of the cable being pushed against stop 64 in order to positively locate the cable—as shown in FIG. 11. The diameter of the first channel in this example is made slightly larger than the diameter of the cable itself (including the jacket). The outer jacket diameter of the exemplary cable is 2.6 mm. The diameter of the first channel in this example is 2.65 mm. With the cable in place in the first channel, the two halves of the tool are closed together as shown in FIG. 8.

Looking at FIG. 11, the reader will note that the distance between stop 64 and first cutter interface 52 is $L_1$. Turning back to FIG. 2, the reader will also note that the length of jacket to be removed during the prior art stripping practice is also $L_1$. In other words, stop 64 is positioned so that the cut made by first cutter interface 52 strips the appropriate length of jacket.

Figure 15:
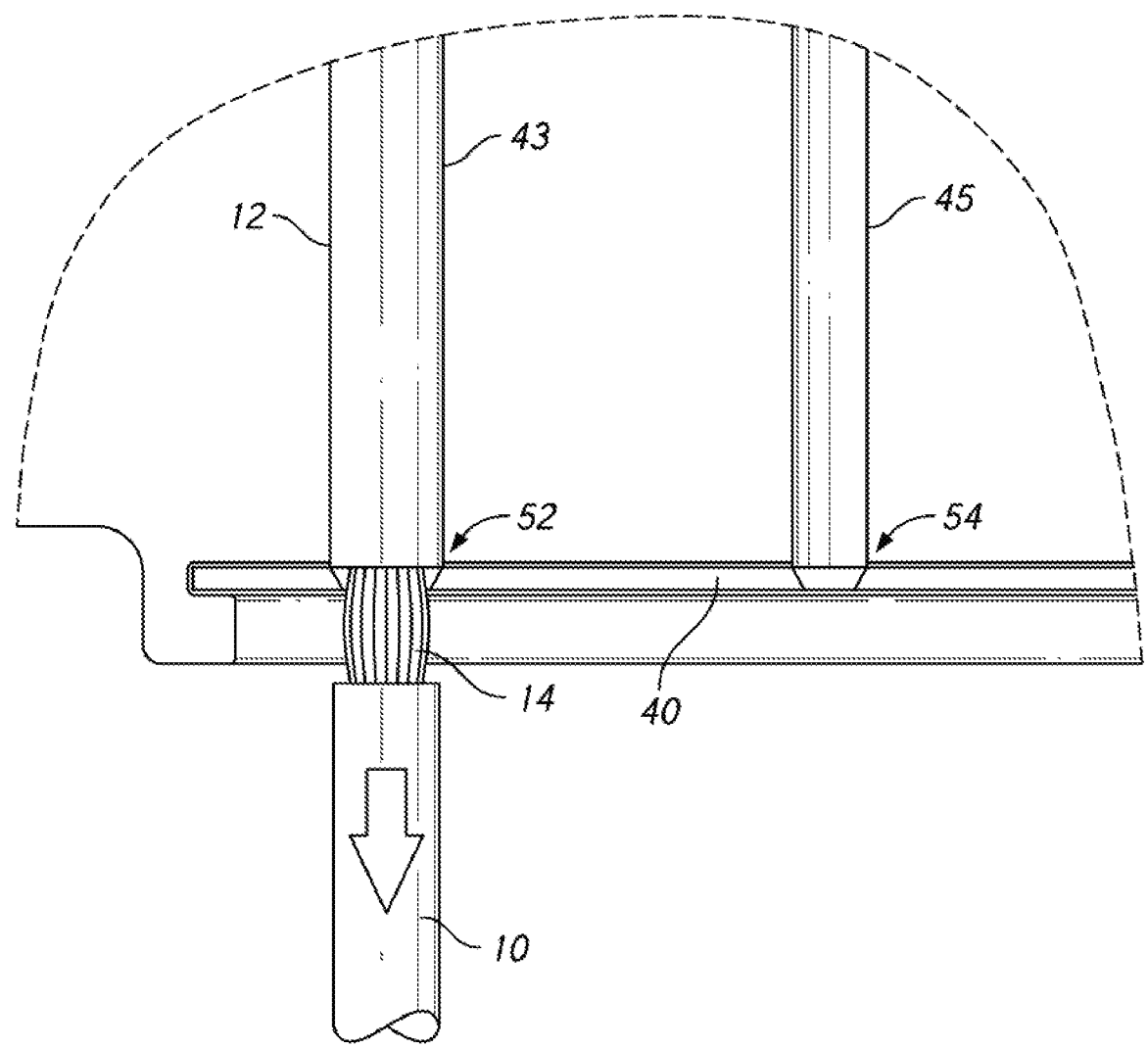
FIG. 15 is a detailed plan view, showing the first and second channels of a preferred embodiment.

After the two halves of the stripping tool are closed, a portion of the cable is trapped within the tool and a portion is still outside. While pressing the two halves together, the user grasps the portion of the cable still outside and pulls in the direction indicated by the arrow in FIG. 11 (out of cutter side 76). FIG. 15 shows a detailed view of fiber optic cable 10 and its shield strands 14 and other components being pulled downward (with respect to the orientation of the view). At the same time, the portion of jacket 12 lying above first cutter interface 52 in the view stays trapped within the stripping tool. The removed portion of the jacket remains within the stripping tool as the cable is pulled completely free. The user then opens the stripping tool and discards the removed length of jacket.

At this point the cable has the configuration shown in FIG. 2. The user pulls back the shield strands as shown in FIG. 3 and uses a separate cutting tool (often a pair of small scissors) to cut away the shield strands close to the end of the cut jacket.

Figure 12:
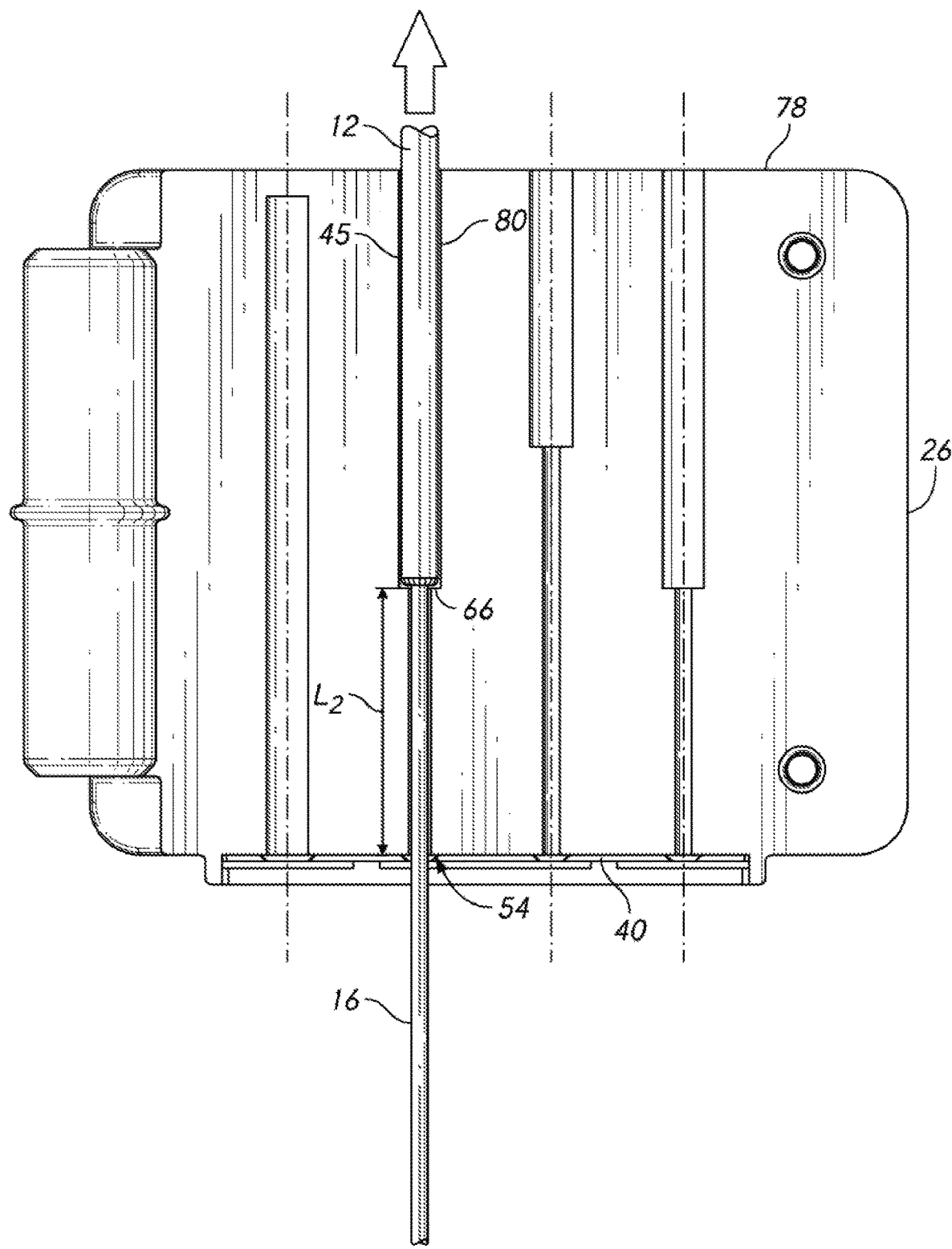
FIG. 12 is a plan view showing the operation of the present invention.

FIG. 12 shows the next step. While the inventive stripping tool remains open, the user inserts cable 12 (in the configuration of FIG. 3 with the addition of the removal of shield strands 14) into second channel 45, with the end of the cable protruding out of opening 80. The second channel has a diameter in this example of 270 microns (the buffer layer having an outer diameter of 250 microns). The user locates the cable longitudinally by urging the cut edge of jacket 12 against stop 66. Once in this position the user again closes the device (as shown in FIG. 8).

Looking again at FIG. 12, this action closes second cutter interface 54 around the cable's buffer layer. The second cutter interface cuts through the buffer layer. Still looking again at FIG. 12, the user then grasps the portion of the cable lying outside opening 80 and pulls it in the direction indicated by the arrow (opposite to the direction the cable was pulled in the configuration of FIG. 11). The length of buffer layer 16 lying outside the stripping tool in FIG. 12 is pulled free from the cable and falls away. The resulting state of the cable is that shown in FIG. 4.

Figure 4:
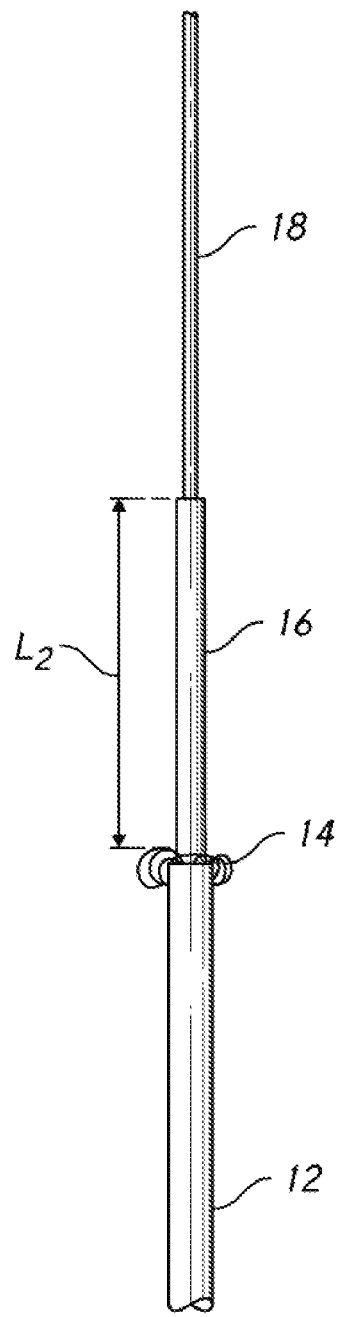
FIG. 4 is an elevation view, showing the cable of FIG. 3 with a length of buffer layer removed.

The length $L_2$ is the length from stop 66 to second cutter interface 54. Turning to FIG. 4, the reader will note that this length $L_2$ corresponds to the distance from the end of jacket 12 to the desired end of buffer layer 16. In operation, the second cutter interface strips the buffer layer between the upper limit of $L_2$ and the end of the cable. Stated another way, the length $L_2$ represents the distance between the cut made by the first cutter interface in the first operation (the cutting of the jacket) and the location of the second cutter interface in the second operation. This length is not always precise because a small "stubble" area of the shield strands will remain around the edge of the jacket cut in the first operation and this area may interfere with bringing the cut edge of the jacket hard against stop 66 (or the other stops in subsequent operations). The variability added is small, however, and since the longitudinal location of the cuts is not critical to the addition of connectors or other operations it poses no concern.

Figure 13:
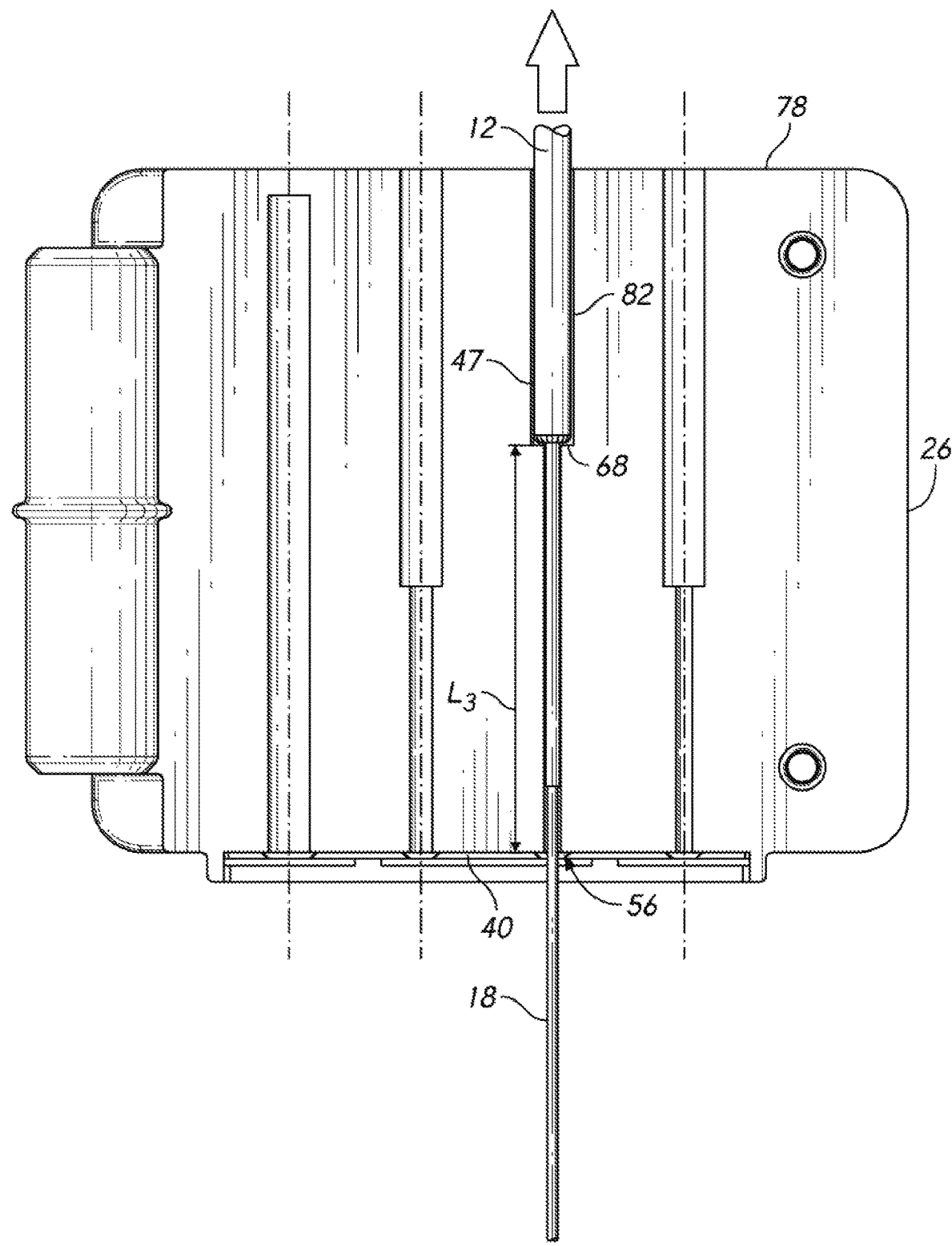
FIG. 13 is a plan view showing the operation of the present invention.

Once the operation shown in FIG. 12 is complete the user again opens the stripping tool. The next step is shown in FIG. 13. The user places the cable (in the state shown in FIG. 4) in third channel 47, with the cable hanging out opening 82 in non-cutter side 78. The cut end of the cable jacket—the cut that was made in the first operation—is urged against stop 68 in order to longitudinally locate the cable. The diameter of the third channel in this example is 140 microns (the outer diameter of the cladding layer being 125 microns). When the inventive stripping tool is closed, third cutter interface 56 cuts into the cladding layer surrounding the optical fiber at the cable's center. With the stripping tool remaining closed, the user grasps the portion of the cable extending out of the tool and pulls it in the direction indicated by the arrow—out of non-cutter side 78. As the cable is pulled out of the tool, third cutter interface 56 strips the cladding from the location shown for the third cutter interface in FIG. 13 out to the end of the cable.

Figure 5:
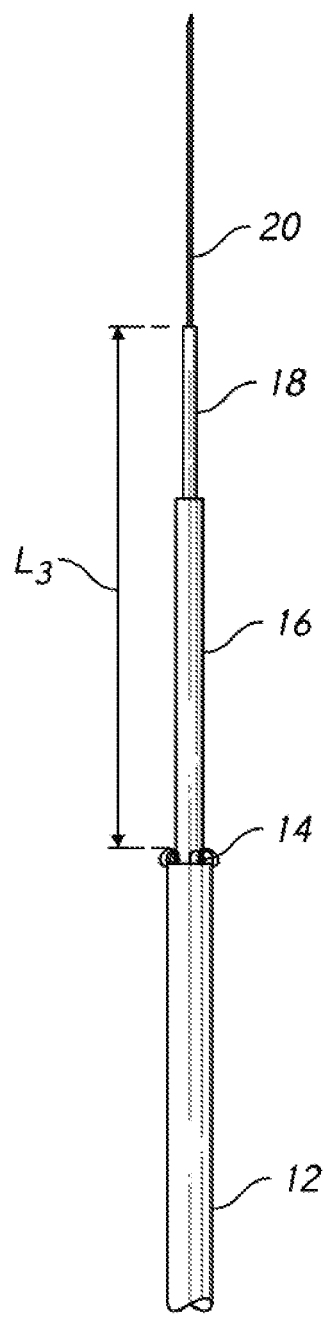
FIG. 5 is an elevation view, showing the cable of FIG. 4, with a length of cladding removed.
Figure 6:
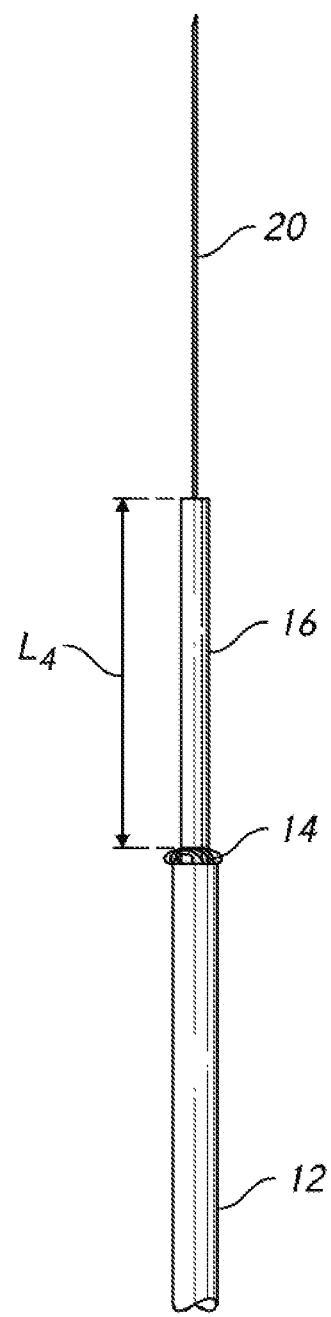
FIG. 6 is an elevation view, showing the cable of FIG. 5, with an additional length of cladding removed.

The length $L_3$ shown in FIG. 13 extends from stop 68 to third cutter interface 56. FIG. 5 shows the same length $L_3$. In operation, the third cutter interface strips the cladding between the upper limit of $L_3$ and the end of the cable. In other words, the length $L_3$ represents the distance between the cut made by the first cutter interface in the first operation and the location of the third cutter interface in the third operation.

The embodiment shown in these figures is configured to strip the cladding layer from the upper limit of $L_2$ (shown in FIG. 4) all the way to the end of the cable. In theory this could be done in one operation. As a practical matter, however, it is difficult to strip such a long length of the cladding without damaging the optical fiber. Thus, the embodiment shown performs this operation in two steps.

Figure 14:
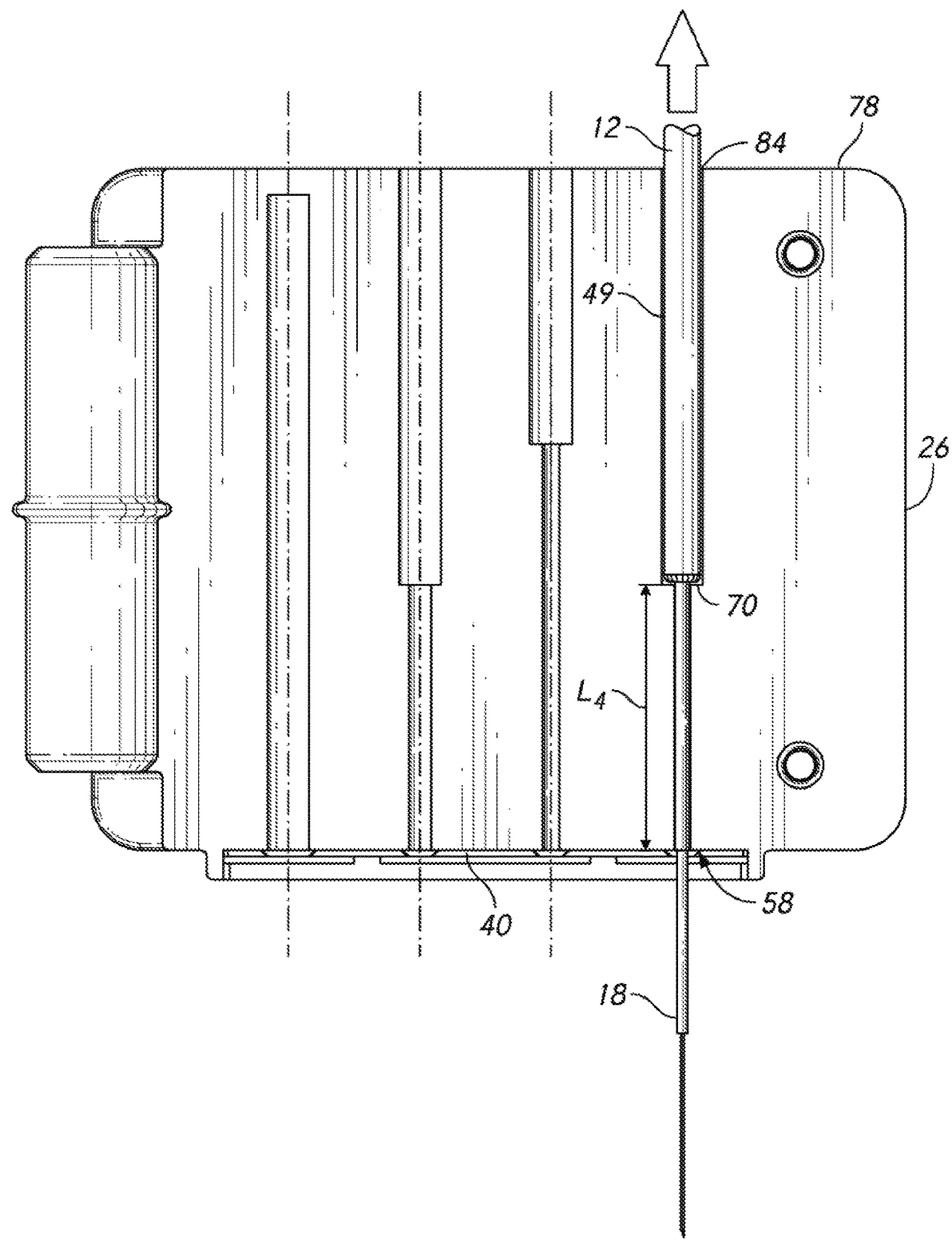
FIG. 14 is a plan view showing the operation of the present invention.

A first length of cladding is stripped in the third operation shown in FIG. 13. The stripping tool is placed in the open position. The remaining length of cladding is stripped in a fourth operation that is shown in FIG. 14. In this view the cable (in the state shown in FIG. 5) is placed in channel 49, which is also given a diameter of 140 microns in this example. The cut end of the cable's jacket is urged against stop 70 to properly locate the cable. The free end of the cable protrudes out opening 84 in non-cutter side 78. The tool is then closed in order to engage fourth cutter interface 58. Once the tool is closed the user grasps the free portion of the cable and pulls it out of the tool in the direction indicated by the arrow. This action strips the remaining portion of cladding layer 18 lying below fourth cutter interface 58 in the orientation of the view. The result is the cable state shown in FIG. 6. The reader will note that the length $L_4$ shown in FIG. 6 corresponds to the length $L_4$ shown in FIG. 14. Stated another way, the length $L_4$ also represents the distance from the cut made in the jacket in the first operation to the fourth cutter interface in the fourth operation.

Figure 16:
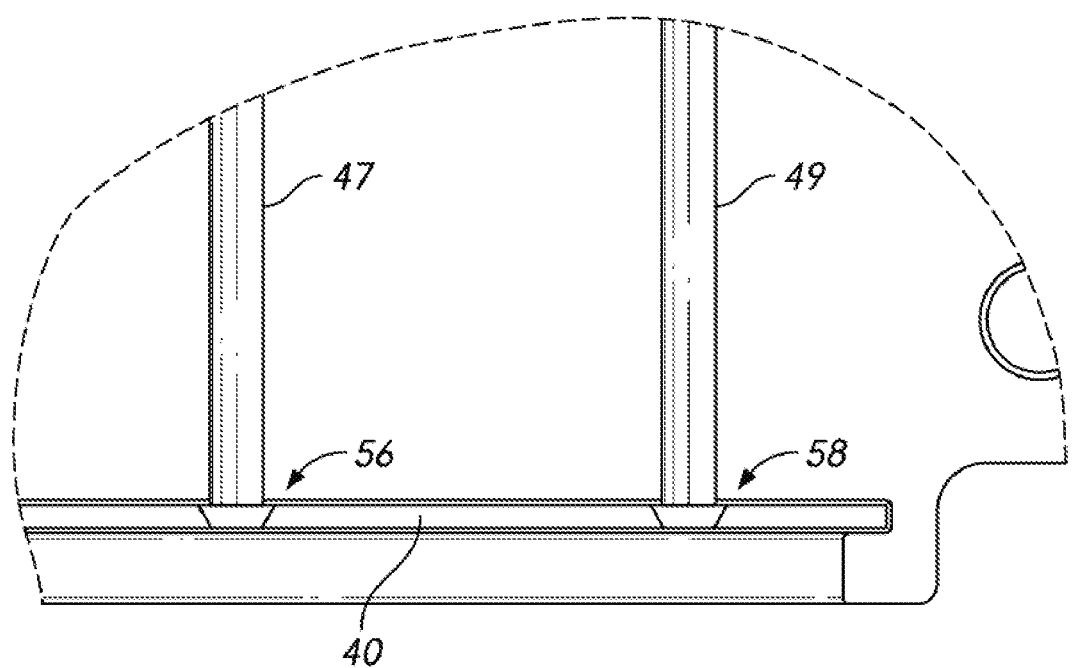
FIG. 16 is a detailed plan view, showing the third and fourth channels of a preferred embodiment.

Looking against at FIG. 9A, those skilled in the art will realize that the cutter interfaces 52, 54, 56, 58 should be carefully sized according to the specific type of cable that the tool is to be used to strip. FIGS. 15 and 16 show these cutter interfaces in more detail. In the example of FIG. 15, first cutter interface 52 is sized to cut through jacket 12. The openings in the first and second blades are configured so that when they close a cutting diameter of 1.8 mm is produced. The exemplary cable has an outer diameter of the shield strands of 2.0 mm and an outer diameter of the jacket of 2.6 mm. In this example, cutter diameter of 1.8 mm consistently cuts the jacket all the way around its circumference without significantly damaging the shield strands.

Second cutter interface 54 in this example is configured to have a cutting diameter of 125 microns. This diameter cuts completely through the cable's buffer layer and allows it to be stripped away. Third cutter interface 56 is shown in FIG. 16. It is configured to have a cutting diameter of 9 microns. This diameter cuts through the cladding layer and allows it to be stripped. Fourth cutter interface 58 is also configured to have a cutting diameter of 9 microns, since it is also intended to strip the cladding layer in this example.

The cutter interfaces in this example are circular. As those skilled in the art will know, it is also possible to use diamond-shaped interfaces. The inventive stripping tool can be provided with diamond-shaped interfaces as well as other shapes.

Returning to FIG. 7, some possible design variations will be explored. The stripping tool can be made as a disposable item that is discarded after a limited number of operations. It is important to minimize costs for such an embodiment. First half 24 and second half 26 can be made using injected molded thermoplastics. Blades 34, 36 can be pressed into the molded thermoplastics. The blades can also be secured via an overmolding process in which the metal blades are placed in the thermoplastic mold and the liquid thermoplastic is injected around the blades. Hinge 28 can be made by snapping together features that are integrally molded with the halves 24, 26. Alternatively, the hinge can be a separate piece that is added.

It is also possible to create a durable embodiment that is intended to be used for an extended period. In this second example the halves 24, 26 could be made of die cast or machined metal. Blades 34, 40 could also be configured to be replaceable. The cutting edges on the blades will become dull over time. When this happens the user can supply a sharp edge by replacing the blade. In still other examples the blade sets can be swapped out to handle different cable geometries.

In reviewing the prior disclosure the reader will appreciate that the inventive stripping tool can be configured to strip a wide range of cables. Variations that can be made to suit include:

1. Providing fewer than four channels;
2. Providing more than four channels;
3. Providing a channel configured to remove the shielding strands such as depicted in FIG. 3;
4. Providing a closure spring configured to urge the two halves 24, 26 together during a stripping operation; and
5. Providing a latching mechanism configured to retain the two halves 24, 26 during a stripping operation.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the claims that follow rather than the examples given.

Having described my invention, I claim:

1. A stripping tool configured to sequentially strip the layers from a cable having a cable end, said cable including a fiber optic core, a cladding layer, over said fiber optic core, a buffer layer over said cladding layer, and a jacket, said stripping tool comprising:
   (a) a first half having a first mating face;
   (b) a second half having a second mating face;
   (c) a hinge connecting said first half to said second half, said hinge having a hinge axis and being configured so that said first mating face mates against said second mating face when said first and second halves are rotated together about said hinge;
   (d) each of said first and second halves having a cutter side and a non-cutter side;

(e) said first and second mating faces opening into a first channel that is parallel to said hinge axis;
(f) said first and second mating faces opening into a second channel that is parallel to said hinge axis;
(g) said first and second mating faces opening into a third channel that is parallel to said hinge axis;
(h) said first half including a first blade proximate said cutter side;
(i) said second half including a second blade proximate said cutter side;
(j) said first and second blades configured to create a first cutter interface, a second cutter interface, and a third cutter interface when said first and second halves are rotated together about said hinge;
(k) said first channel being aligned with said first cutter interface;
(l) said second channel being aligned with said second cutter interface;
(m) said third channel being aligned with said third cutter interface;
(n) said first channel including a first stop, said first stop being configured to position said cable so that said first cutter interface cuts said cable jacket a distance $L_1$ from said cable end;
(o) said second channel including a second stop, said second stop being configured to position said cable so that said second cutter interface cuts said buffer layer a distance $L_2$ from said cut made by said first cutter interface; and
(p) said third channel including a third stop, said third stop being configured to position said cable so that said third cutter interface cuts said cladding layer a distance $L_3$ from said cut made by said first cutter interface.

2. The stripping tool as recited in claim 1, wherein each of said cutter interfaces is created by a first arcuate edge on said first blade and a second arcuate edge on said second blade.

3. The stripping tool as recited in claim 1, further comprising:
(a) said first and second mating faces opening into a fourth channel that is parallel to said hinge axis;
(b) said first and second blades configured to create a fourth cutter interface when said first and second halves are rotated together about said hinge;
(c) said fourth channel being aligned with said fourth cutter interface; and
(d) said fourth channel including a fourth stop, said fourth stop being configured to position said cable so that said fourth cutter interface cuts said cladding layer a distance $L_4$ from said cut made by said first cutter interface.

4. The stripping tool as recited in claim 1 wherein said first and second halves are made of molded plastic.

5. The stripping tool as recited in claim 4, wherein said hinge is integrally molded with said first and second halves.

6. The stripping tool as recited in claim 1, wherein said second mating face includes a receiver and said first mating face includes a pin configured to fit into said receiver.

7. The stripping tool as recited in claim 1, wherein:
(a) said first half includes a first notch opposite said first mating face; and
(b) said second half includes a second notch opposite said second mating face.

8. The stripping tool as recited in claim 1, wherein said first channel has a diameter that is approximately the same as an outer diameter of said cable including said jacket.

9. The stripping tool as recited in claim 8, wherein said second channel has a diameter that is approximately the same as an outer diameter of said buffer layer.

10. The stripping tool as recited in claim 9, wherein said third channel has a diameter that is approximately the same as an outer diameter of said cladding layer.

11. A stripping tool configured to allow a user to sequentially strip the layers from a cable having a cable end, said cable including a fiber optic core, a cladding layer, over said fiber optic core, a buffer layer over said cladding layer, and a jacket, said stripping tool comprising:
(a) a first half having a first mating face;
(b) a second half having a second mating face;
(c) a hinge connecting said first half to said second half, said hinge having a hinge axis and being configured so that said first mating face mates against said second mating face when said first and second halves are rotated together about said hinge;
(d) each of said first and second halves having a cutter side and a non-cutter side;
(e) said first half including a first blade proximate said cutter side;
(f) said second half including a second blade proximate said cutter side;
(g) said first and second blades configured to create a first cutter interface, a second cutter interface, and a third cutter interface when said first and second halves are rotated together about said hinge;
(h) said first cutter interface being configured to strip said jacket when said user closes said first and second halves together and pulls said cable out said cutter side of said first and second halves;
(i) said second cutter interface being configured to strip said buffer layer when said user closes said first and second halves together and pulls said cable out said non-cutter side of said first and second halves; and
(j) said third cutter interface being configured to strip said cladding layer when said user closes said first and second halves together and pulls said cable out said non-cutter side of said first and second halves.

12. The stripping tool as recited in claim 11, wherein each of said cutter interfaces is created by a first arcuate edge on said first blade and a second arcuate edge on said second blade.

13. The stripping tool as recited in claim 11, further comprising:
(a) said first and second mating faces opening into a first channel that is parallel to said hinge axis;
(b) said first and second mating faces opening into a second channel that is parallel to said hinge axis;
(c) said first and second mating faces opening into a third channel that is parallel to said hinge axis;
(d) said first and second mating faces opening into a fourth channel that is parallel to said hinge axis;
(e) said first and second blades configured to create a fourth cutter interface when said first and second halves are rotated together about said hinge;
(f) said fourth channel being aligned with said fourth cutter interface; and
(g) said fourth channel including a stop, said stop being configured to position said cable so that said fourth cutter interface cuts said cladding layer a distance $L_4$ from a cut made by said first cutter interface.

14. The stripping tool as recited in claim 13, wherein said first channel has a diameter that is approximately the same as an outer diameter of said cable including said jacket.

15. The stripping tool as recited in claim 13, wherein said second channel has a diameter that is approximately the same as an outer diameter of said buffer layer.

16. The stripping tool as recited in claim 15, wherein said third channel has a diameter that is approximately the same as an outer diameter of said cladding layer.

17. The stripping tool as recited in claim 11 wherein said first and second halves are made of molded plastic.

18. The stripping tool as recited in claim 17, wherein said hinge is integrally molded with said first and second halves.

19. The stripping tool as recited in claim 11, wherein said second mating face includes a receiver and said first mating face includes a pin configured to fit into said receiver.

20. The stripping tool as recited in claim 11, wherein:
   (a) said first half includes a first notch opposite said first mating face; and
   (b) said second half includes a second notch opposite said second mating face.

\* \* \* \* \*